(12) United States Patent
Oura

(10) Patent No.: US 6,661,595 B1
(45) Date of Patent: Dec. 9, 2003

(54) CASSETTE LOADING DEVICE HAVING DUSTPROOF MECHANISM

(75) Inventor: Hideki Oura, Matsuyama (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/377,176

(22) Filed: Aug. 19, 1999

(30) Foreign Application Priority Data

Aug. 20, 1998 (JP) .......................................... 10-250497

(51) Int. Cl.⁷ .......................... G11B 17/00; G11B 15/00
(52) U.S. Cl. ........................................... 360/69; 360/93
(58) Field of Search .......................... 360/60, 69, 96.5, 360/96.6, 71, 132, 92, 93, 95

(56) References Cited

U.S. PATENT DOCUMENTS 4,800,449 A    1/1989  Yamasaki ..................... 360/71
5,225,954 A  * 7/1993  Kondo ........................ 360/132
5,625,507 A  * 4/1997  Ota et al. ..................... 360/71
6,198,596 B1 * 3/2001  Kumagai et al. ........... 360/96.5

FOREIGN PATENT DOCUMENTS

JP            6-119691          4/1994

* cited by examiner

Primary Examiner—Andrew L. Sniezek
(74) Attorney, Agent, or Firm—Wenderoth, Lind & Ponack, L.L.P.

(57) ABSTRACT

A cassette loading device includes a dust protection mechanism having a dustproof lid member provided on the cassette, and the dustproof lid member is closed when an access to the recording medium is judged to be unnecessary even in the course of holding the cassette loaded in the recording and/or reproducing apparatus. Thus, the loading condition of the cassette is released with the dustproof lid member closed under the control of the loading control mechanism, and therefore the surface of the recording medium can be effectively prevented from being stuck with dust.

2 Claims, 2 Drawing Sheets

CASSETTE LOADING DEVICE HAVING DUSTPROOF MECHANISM

BACKGROUND OF THE INVENTION

1. Field of the Invention

The present invention generally relates to a cassette loading device, and in particular to a cassette loading device for detachably loading a recording medium cassette to a data recording and/or reproducing apparatus where the cassette loading device has a dust protection mechanism for effectively preventing external dust from sticking to a surface of the recording medium. The cassette loading device is adapted to such as a video and/or audio magnetic tape cassette and/or optical recording medium cassette or the like having a dustproof cover member for protection from the external dust.

2. Description of the Prior Art

Generally, in a cassette loading device for loading a magnetic recording tape cassette or the like on a magnetic recording and/or reproducing apparatus, for example, such as a video and/or audio tape recorder, the tape cassette is provided with a dustproof lid member on one side face of the tape cassette for covering a tape pull-out opening formed therein through which a magnetic recording tape is pulled out and pulled in, and thereby the magnetic tape can be protected from being stuck with external dust or waste particles outside the cassette by closing the dustproof lid member covering over the tape pull-out opening when the recording and/or reproducing operation on the magnetic tape is not played.

In this conventional construction of the cassette loading device, when the tape cassette is loaded on the magnetic recording and/or reproducing apparatus using the cassette loading device, the cassette loading device first receives a cassette insertion detection signal indicating that the cassette is inserted to the magnetic recording and/or reproducing apparatus and then the tape cassette is carried to a predetermined play position for playing recording and/or reproduction in the apparatus. Then, the dustproof lid is opened to pull out the magnetic tape from the cassette to be abutted with a magnetic pick-up head for playing recording and/or reproduction.

When the tape cassette is unloaded from the magnetic recording and/or reproducing apparatus, a cassette pullout switch is turned on to generate a cassette pullout signal which is applied to the cassette loading device. Upon receipt of the cassette pullout signal, the magnetic tape drawn out from the tape cassette is pulled back and stored in the tape cassette to release the loading state of the magnetic tape. Thereafter, the dustproof lid of the tape cassette is closed and the tape cassette is taken out from the magnetic recording and/or reproducing apparatus.

In this conventional cassette loading device, however, after the tape cassette is inserted in the magnetic recording and/or reproducing apparatus and loaded thereon, the dustproof lid remains in its opened state with the magnetic tape pulled out from the cassette until the tape cassette is taken out from the magnetic recording and/or reproducing apparatus with receipt of the cassette pullout signal.

Accordingly, after a necessary recording and/or reproducing operation is ended on the magnetic tape pulled out of the tape cassette loaded in the magnetic recording and/or reproducing apparatus, even in a stage where an access to the magnetic tape is no more necessary, the dustproof lid of the tape cassette inserted in the apparatus remains in the opened state so long as the cassette pullout signal is not received. Therefore, if the tape cassette is left as it is inserted in the apparatus with the magnetic tape pulled out from the cassette, there arises a problem that the dust, which has intruded into the apparatus, sticks to the surface of the magnetic tape.

SUMMARY OF THE INVENTION

The present invention has been developed to solve this problem and has an essential object to provide an improved cassette loading device having a dust protection mechanism effectively preventing dust from sticking to a surface of a recording medium even when a recording medium cassette is left as it is inserted in a recording and/or reproducing apparatus.

In order to achieve the object mentioned above, the present invention provides a cassette loading device for removably loading a cassette having a recording medium accommodated therein to and from a recording and/or reproducing apparatus, the cassette loading device comprising: a dust protection mechanism having a dustprooflid member provided on the cassette, wherein the dustproof lid member is closed when an access to the recording medium is judged to be unnecessary even in the course of holding the cassette loaded in the recording and/or reproducing apparatus.

The cassette loading device further comprises: a cassette loading mechanism for carrying the cassette between a play position accessible to the recording medium and a cassette insertion position in the recording and/or reproducing apparatus while loading the recording medium and releasing the loading condition thereof, and a loading control mechanism for controlling the dust protection mechanism and the cassette loading mechanism, wherein the dust protection mechanism comprises a lid opening and closing member for opening and closing the dustproof lid member, and, upon insertion of the cassette into the apparatus, the loading control mechanism controls the cassette loading mechanism to move the cassette to an abutment position abutted to the lid opening and closing member with the dustproof lid member in a closed state and subsequently to move the cassette to the play position with the dustproof lid member being opened under the control of the loading control mechanism.

The loading control mechanism includes a loading position detecting unit for detecting a position of the cassette loaded in the recording and/or reproducing apparatus, and the loading control mechanism controls the movement of the cassette based on the detected position of the cassette.

The loading control mechanism further includes an access judging unit for judging necessity of accessing the recording medium.

When the access judging unit judges that the access to the recording medium is necessary, the loading control mechanism controls the cassette to be kept in the play position for accessing the recording medium, and when the access judging unit judges that the access to the recording medium is unnecessary, the loading control mechanism controls the cassette to store the recording medium therein and to move back the cassette to the abutment position abutted to the lid opening and closing member with the dustproof lid member closed.

By this arrangement, according to the cassette loading device of the present invention, even when the recording medium cassette is left in the state of being stored in the recording and/or reproducing apparatus, in the case where the access to the recording medium is judged to be unnecessary, the loading condition of the recording medium cassette is released so that the dustproof lid member is closed under the control of the loading control mechanism, and therefore the surface of the recording medium can be effectively prevented from being stuck with dust.

BRIEF DESCRIPTION OF THE DRAWINGS

These and other objects and features of the present invention will be readily understood from the following detailed description taken in conjunction with preferred embodiments thereof with reference to the accompanying drawings, in which like parts are designated by like reference numerals and in which:.

DETAILED DESCRIPTION OF THE PREFERRED EMBODIMENTS

Figure 1:
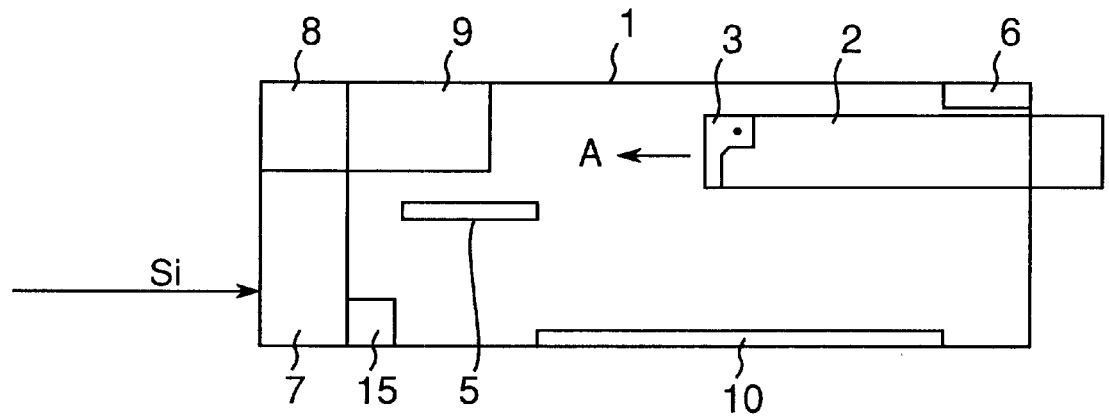
FIG. 1 is an explanatory conceptual view showing a schematic construction of a cassette loading device at an initial state of inserting a tape cassette according to the present invention.

Before the detailed description proceeds, it is noted that like parts are designated by like reference numerals throughout the accompanying drawings.

A preferred embodiment of a cassette loading device will be described below with reference to the accompanying drawings of FIGS. 1 through 4. It is noted here that the explanation is made in this embodiment in the case of using a magnetic tape cassette as an example of a recording medium cassette to be loaded to a data recording and/or reproducing apparatus.

Figure 2:
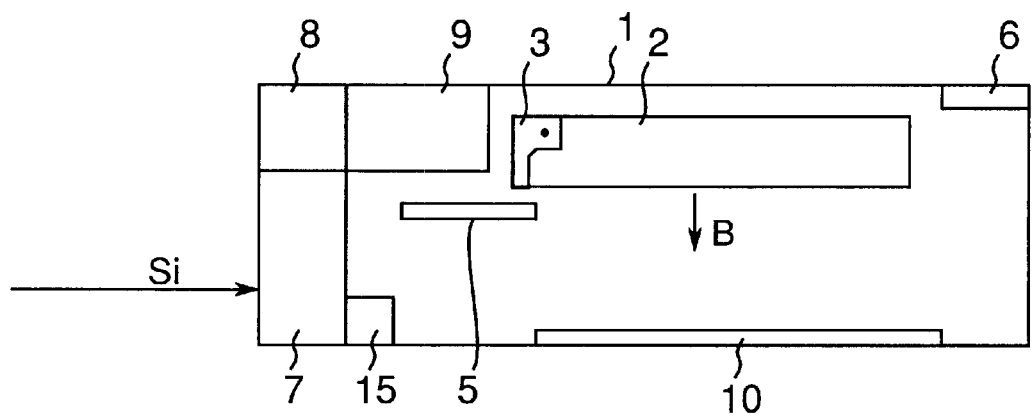
FIG. 2 is an explanatory conceptual view showing a schematic construction of a cassette loading device in a state of loading a tape cassette with a dustproof lid cover closed according to the present invention.
Figure 3:
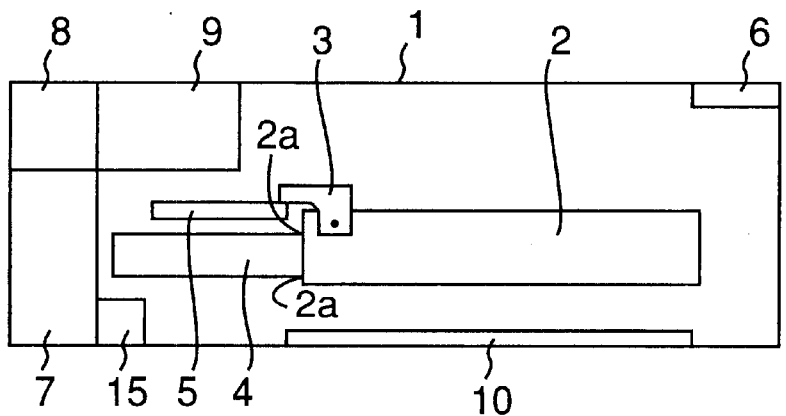
FIG. 3 is an explanatory conceptual view showing a schematic construction of a cassette loading device in a state of loading a tape cassette with a dustproof lid cover opened according to the present invention.
Figure 4:
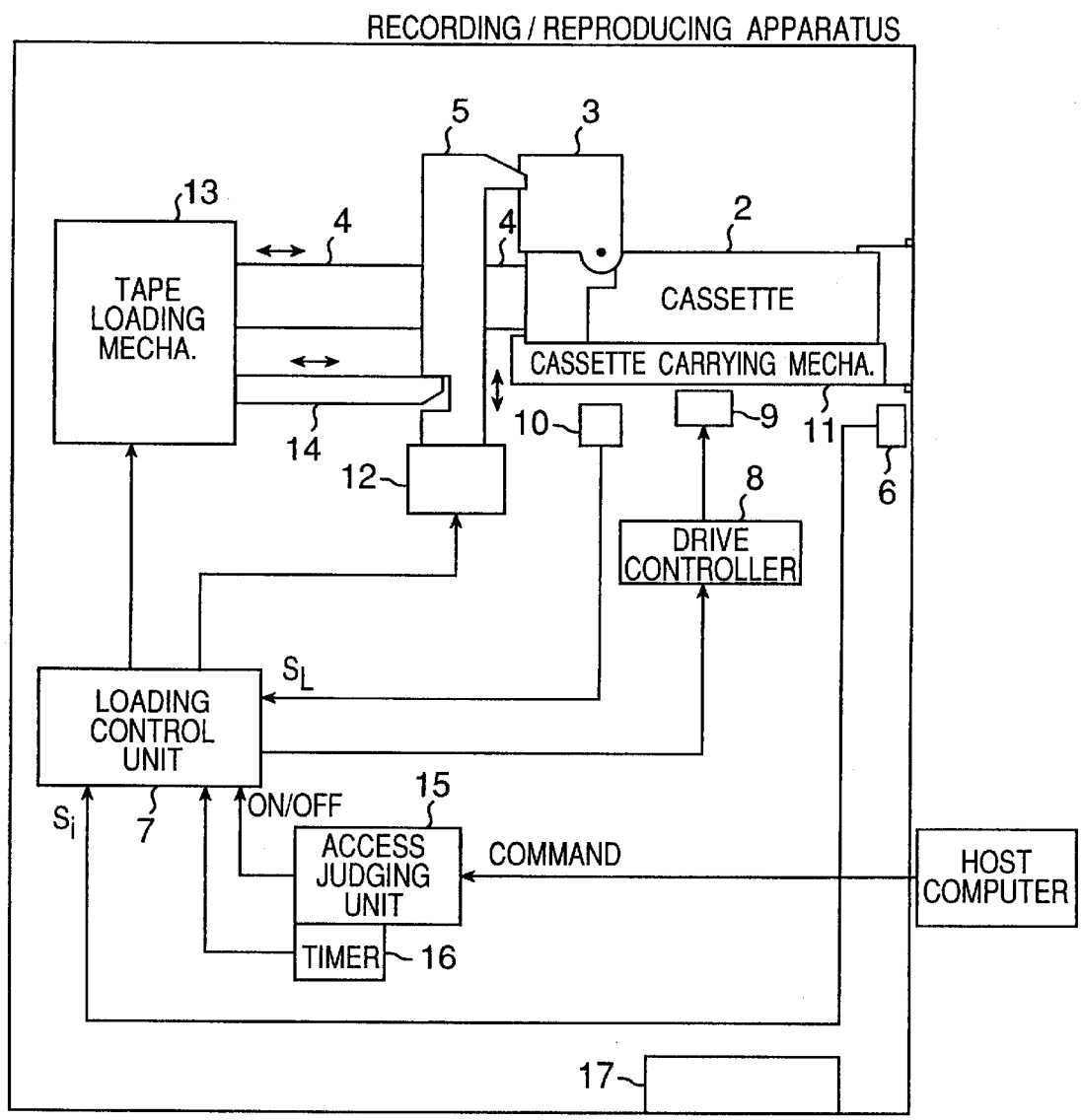
FIG. 4 is a block diagram showing entire parts of the cassette loading device when a tape cassette is loaded in a data recording and/or reproducing apparatus according to the present invention.

FIG. 1 shows an initial state of a cassette loading device when a tape cassette is inserted into an insertion mouth of a magnetic recording and reproducing apparatus in the first loading stage. FIG. 2 shows a subsequent state of the cassette loading device in the second loading stage where the tape cassette is in the course of movement to a play position suited for recording and/or reproduction. FIG. 3 shows a state of the cassette loading device in the third loading stage where the tape cassette is located to the play position with a magnetic recording tape pulled out therefrom to be accessed for an recording and/or reproducing operation. FIG. 4 shows a schematic construction of entire parts of the cassette loading device when the tape cassette is loaded in the magnetic recording and/or reproducing apparatus.

In FIGS. 1, 2, 3 and 4, the cassette loading device designated by reference numeral 1 is provided in the magnetic recording and/or reproducing apparatus, where the cassette loading device 1 includes a cassette carrying mechanism 11 (see FIG. 4) which is driven by e.g. a drive motor unit 9 so that the cassette carrying mechanism 11 carries a tape cassette 2 loaded thereon between a play position for recording and/or reproduction and an insertion entrance position in the magnetic recording and/or reproducing apparatus. The tape cassette 2 stores a magnetic tape 4 and has a dustproof lid member 3 which is mounted in a pivotally rotatable manner on one side face thereof for covering over a tape pullout opening 2a defined therein where the magnetic tape 4 is pulled out from the tape cassette 2 through the tape pullout opening 2a.

The cassette loading device 1 further includes a lid opener lever 5 for pivotally opening and closing the dustproof lid member 3 by abutment. In a preferred embodiment, as shown in FIG. 4, the lid opener lever 5 may be driven by an opener drive unit 12 so that the opener lever 5 is moved up and down to open and close the dustproof lid member 3. The cassette loading device 1 further includes a cassette insertion detection unit 6 comprised of such as a sensor which is located at a position, for example, in the vicinity of the mouth portion of the magnetic recording and reproducing apparatus for detecting insertion of the tape cassette 2 into the apparatus.

The cassette loading device 1 further includes a loading control unit 7 which controls a drive controller 8 including control of the drive motor unit 9 to drive the cassette carrying mechanism 11. The loading control unit 7 also controls a tape loading mechanism 13 which pulls out or pulls back the magnetic tape from or to the tape cassette 2. The drive motor unit 9, cassette carrying mechanism 11 and tape loading mechanism 13 constitute a cassette loading mechanism. Meanwhile, the dustproof lid member 3 and lid opener lever 5 in combination with the loading control unit 7 constitute a dust protection mechanism.

Reference numeral 10 denotes a loading position detecting unit for detecting a position of the tape cassette 2 loaded in the magnetic recording and/or reproducing apparatus. The loading position detecting unit 10 can be comprised of one or more sensors or an encoder. The loading position detecting unit 10 may include a function of the cassette insertion detecting unit 6. Alternatively, the loading position of the tape cassette can be detected by providing a counter for counting a rotation number of the drive motor unit 9.

The cassette loading device 1 further includes an access judging unit 15 for reading a command transmitted from an external apparatus such as a host computer and for deciding whether access to the magnetic recording tape 4 is necessary with regard to the received command. The access judging unit 15 generates an access ON or OFF signal based on the judgment. Alternatively, the function of the access judging unit 15 may be included in the loading control unit 7. The loading control unit 7, drive controller 8, loading position detecting unit 10 and access judging unit 15 constitute a loading control mechanism for controlling the cassette loading mechanism and dust protection mechanism.

The following describes an operation of the cassette loading device. In the first loading stage as shown in FIG. 1, when insertion of the tape cassette 2 is detected by the sensor 6, the sensor transmits a cassette insertion detection signal $S_i$ to the loading control unit 7. Upon receipt of the cassette insertion detection signal $S_i$, the loading control unit 7 controls the drive controller 8 to operate the drive motor unit 9 to horizontally move the cassette carrying mechanism 11 carrying the tape cassette 2 loaded thereon toward the play position in a direction shown by an arrow mark A.

Subsequently in the second loading stage as shown in FIG. 2, the inserted tape cassette 2 loaded on the cassette carrying mechanism 11 is carried toward the play position with its dustproof lid member 3 remaining in the closed state until the dustproof lid member 3 abuts to an edge of the lid opener lever 5 while the position of the tape cassette 2 is all the time detected by the loading position detecting unit 10.

When using a fixed type of the lid opener lever 5 fixed in position, the drive controller 8 then controls the drive motor unit 9 to vertically move the cassette carrying mechanism 11 downward as shown by an arrow mark B with the bottom edge of the dustproof lid member 3 abutted to the edge portion of the lid opener lever 5 fixed in position. Thus, the dustproof lid member 3 can be opened by engagement with the edge portion of the of the lid opener lever 5. In this case, the drive motor unit 9 includes a first and second drive motors (not shown) for horizontally and vertically moving the cassette carrying mechanism 11, respectively.

Alternatively, in a preferred embodiment, by providing an opener drive unit 12 and opener lock lever 14 as shown in FIG. 4, the loading control unit 7 may also control the opener drive unit 12 to move the lid opener lever 5 upward to thereby open the dustproof lid member 3 without vertical movement of the cassette carrying mechanism 11, and then the lid opened state may be locked by the opener lock lever 14 which is comprised of such as a malfunction preventing claw controlled by the tape loading mechanism 13, thereby maintaining the lid opened state.

Subsequently, when the tape cassette 2 is located on the specified play position accessible to the magnetic recording tape 4 in the third loading stage as shown in FIG. 3, the loading position detecting unit 10 detects the desired accessible loading state of the tape cassette and transmits a loading detection signal $S_L$ to the loading control unit 7, which controls the drive controller 8 to stop the drive motor unit 9 to thereby stop the cassette carrying mechanism 11 so that the tape cassette 2 is settled in the accessible loading state fixed to the accessible play position.

At this stage, the access judging unit 15 judges whether access to the magnetic tape is necessary based on interpretation of a command transmitted from e.g. a host computer to the magnetic recording and reproducing apparatus. That is, when the magnetic recording and reproducing apparatus holds a write or read command of recording and/or reproduction transmitted from the host computer, the access judging unit 15 judges that access to the magnetic tape is necessary and generates the access ON signal to the loading control unit 7. The loading control unit 7 subsequently controls the drive motor unit 9 to keep the cassette carrying mechanism 11 in the stop state in the accessible play position. At the same time, the loading control unit 7 also controls the tape loading mechanism 13 to pull out the magnetic tape 4 from the tape cassette 2 using a tape engagement device including such as a magnetic pick-up head (not shown) so that the recording and/or reproduction operation is conducted based on the interpretation of the command.

When there is no received command for recording and/or reproduction from the host computer, the access judging unit 15 judges that the access to the magnetic tape is not necessary, and generates the access OFF signal to the loading control unit 7, and then the loading control unit 7 controls the tape loading mechanism 13 to pull back the magnetic tape into the tape cassette 2, and also controls the drive motor unit 9 to move back the cassette carrying mechanism 11 to the second loading stage shown in FIG. 2 with the dustproof lid member 3 closed by releasing the lock state of the lid opener lever 5.

Thus, by this arrangement described above, in the case where the access judging unit 15 judges that access to the magnetic tape is not necessary, the loading condition of the magnetic tape is released by releasing the lock of the lid opener lever 5 so that the dustproof lid member 3 is closed by moving the tape cassette upward with respect to the lid opener lever 5 or by moving the lid opener lever 5 downward with respect to the tape cassette 2 under the control of the loading control unit 7. Therefore, the surface of the magnetic tape 4 can be effectively prevented from being stuck with dust even when the tape cassette 2 is left in the state of being stored in the recording and/or reproducing apparatus.

In a preferred embodiment of the cassette loading device, a timer 16 may be provided for measuring a lapse time from a judging time point upon reception of the access OFF signal by the loading control unit 7 when the access judging unit 15 judges that access to the magnetic tape is not necessary, and after a predetermined time lapse, the drive motor unit 9 is controlled to move back the tape cassette 2 mounted on the cassette carrying mechanism 11 to the second loading stage shown in FIG. 2 with the dustproof lid member 3 closed from the third loading stage shown in FIG. 3. By this arrangement, a frequent repetition of movement of the tape cassette 2 and opening and closing operation of the dustproof lid member 3 can be effectively prevented, achieving an efficient movement of the tape cassette with minimum necessary opening and closing operation of the dustproof lid member.

Moreover, by providing a spare power source 17 in preparation for use when an accidental power off state occurs, even in the case where the power supply is accidentally cut off owing to e.g. failure or stoppage of electric power supply, the control system of the cassette loading device can be constantly supplied with electric power. Therefore, the cassette loading device can be effectively operated all the time and the surface of the magnetic tape 4 can be effectively prevented from being stuck with dust by closing the dustproof lid member even when the tape cassette 2 is left in the recording and reproducing apparatus.

Although a magnetic tape cassette is used as a recording medium cassette for use in a magnetic recording and reproducing apparatus in this embodiment, the present invention may be applicable for other type of e.g. an optical recording and/or reproducing apparatus using an optical disk or the like recording medium cassette.

As described above, according to the cassette loading device of the present invention, even when the recording medium cassette is left in the state of being stored in the recording and/or reproducing apparatus, in the case where access to the recording medium is judged to be unnecessary, the loading condition of the recording medium cassette is released so that the dustproof lid member is closed under the control of the loading control unit. Therefore, the surface of the recording medium can be effectively prevented from being stuck with dust.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A cassette loading device operable to move a cassette within a recording and/or reproducing apparatus, said cassette loading device comprising:

a dust protection mechanism;

an access judging unit for judging whether accessing a recording medium accommodated within the cassette is necessary or unnecessary:

a cassette loading mechanism operable to carry the cassette between a play position and a cassette insertion position, to load the recording medium when the cassette is in the play position and to unload the recording medium when the cassette is in the play position; and a loading control mechanism operable to control said dust protection mechanism and said cassette loading mechanism, wherein said dust protection mechanism is operable to close dustproof lid member provided on the cassette when said access judging unit judges that access that access to the recording medium is unnecessary, wherein said dust protection mechanism comprises a lid opening and closing member for opening and closing the dustproof lid member, wherein said loading control mechanism is operable to control said cassette loading mechanism to move the cassette to an abutment position in which the cassette abuts said lid opening and closing member with the dustproof lid member in a closed state, and said loading control mechanism is operable to subsequently move the cassette to the play position such that the dustproof lid member is opened under the control of said loading control mechanism, wherein said loading control mechanism includes a timer for measuring a lapse time from a judging time point when said access judging unit judges that access to the recording medium is unnecessary, and wherein the cassette is moved back to the abutment position with the dustproof lid member in a closed state after a predetermined time lapse born the judging time point.

2. A cassette loading device operable to move a cassette within a recording and/or reproducing apparatus, said cassette loading device comprising:

a dust protection mechanism;

an access judging unit for judging whether accessing a recording medium accommodated within the cassette is necessary or unnecessary when the recording and/or reproducing apparatus is in an ON state;

a cassette loading mechanism operable to carry the cassette between a cassette insertion position and a play position, to load the recording medium when the cassette is in the play position and to unload the recording medium when the cassette is in the play position; and a loading control mechanism operable to control said dust protection mechanism and said cassette loading mechanism, wherein said dust protection mechanism is operable to close a dustproof lid member provided on the cassette when said access judging unit judges that access to the recording medium is unnecessary, wherein said dust protection mechanism is operable to open the dustproof lid member when said access judging unit judges that access to the recording medium is necessary, wherein said dust protection mechanism comprises a lid opening and closing member for opening and closing the dustproof lid member, wherein said loading control mechanism is operable to control said cassette loading mechanism to move the cassette to an abutment position abutted to said lid opening and closing member with the dustproof lid member in a closed state and is operable to subsequently to move the cassette to the play position such that the dustproof lid member is opened under the control of said loading control mechanism, wherein said loading control mechanism includes a timer for measuring a lapse time from a judging time point when said access judging unit judges that access to the recording medium is unnecessary, and wherein the cassette is moved back to the abutment position with the dustproof lid member in a closed state after a predetermined time lapse from the judging time point.

* * * * *